United States Patent [19]

Gordon

[11] Patent Number: 4,641,605
[45] Date of Patent: Feb. 10, 1987

[54] ANIMAL LITTER AND METHOD OF PREPARATION
[75] Inventor: Charles Gordon, Vernon, Calif.
[73] Assignee: Kal Kan Foods, Inc., Vernon, Calif.
[21] Appl. No.: 803,135
[22] Filed: Nov. 29, 1985
[51] Int. Cl.$^4$ ............................................. A01K 1/015
[52] U.S. Cl. ..................................................... 119/1
[58] Field of Search ............................................ 119/1
[56] References Cited

U.S. PATENT DOCUMENTS

| | | |
|---|---|---|
| 2,649,759 | 8/1953 | Gibbs ........................................ 119/1 |
| 3,029,783 | 4/1962 | Sawyer, Jr. et al. ..................... 119/1 |
| 3,776,188 | 12/1973 | Komakine ................................ 119/1 |
| 3,921,581 | 11/1975 | Brewer .................................... 119/1 |
| 4,341,180 | 7/1982 | Cortigene et al. ...................... 119/1 |

Primary Examiner—Hugh R. Chamblee
Attorney, Agent, or Firm—Curtis, Morris & Safford

[57] ABSTRACT

An animal litter is described which retards the development of ammonia and markedly reduces human perception of urine and fecal aromas. The animal litter comprises an absorbent granular litter material which is first sprayed with sodium or ammonium persulfate and then dusted with a solid buffering agent to maintain a neutral pH during use by the animal.

21 Claims, No Drawings

ANIMAL LITTER AND METHOD OF PREPARATION

FIELD OF THE INVENTION

The present invention relates to an animal litter and method of its preparation and, more particularly, to an animal litter containing an oxidizing agent and a pH-maintaining agent which together act to deodorize animal urine and fecal aromas.

BACKGROUND OF THE INVENTION

The housing of small animals presents many well known difficulties with respect to disposal of their wastes. This disposal is ordinarily accomplished by the use of animal litter capable of sorbing liquid wastes to a sufficient degree that the litter is useful for at least several days before noxious odors emanating from the litter necessitate its removal.

Desirable attributes of such an animal litter are that it possess high liquid sorptivity, a low degree of dusting, adequate crush strength, non-toxicity and ability to be evenly distributed and deposited in its appointed place in ready-for-use form.

Various substances are commonly utilized as litter materials for animals. Such substances include clays, for example, bentonites and fuller's earth (attapulgite); diatomaceous earth (kieselguhr); vermiculite; woodchips; alfalfa; cherry pits; foamed plastic; paper; citrus pulp; corn cobs; peanut hulls; solid waste from paper mills; fly ash; and sawdust. Most of these materials are characterized by a relatively high surface area and high moisture absorbency. However, these litter materials are unsatisfactory in that they fail to suppress adequately odors emanating from liquid wastes and from solid excreta, are expensive, become moldy when wet, have an objectionable odor of their own, disintegrate when wet or are disliked and rejected by cats or other small animals as places to defecate and/or urinate.

U.S. Pat. No. 4,437,429 describes an animal litter to which is added an uncalcined, hydrated zeolite, such as clinoptilolite, in an amount effective to reduce the ammonia odor. U.S. Pat. No. 4,263,873 relates to an animal litter made from pelletized paper containing an acid salt, preferably sodium acid sulfate, for neutralizing the urine and preventing the formation and release of ammonia odors resulting from the urine. U.S. Pat. No. 3,892,846 treats conventional litter with hydroxamic acid in an amount sufficient to inhibit the decomposition of urine to ammonia. Whereas these prior art compositions effectively reduce or eliminate ammonia, they provide little or no abatement of fecal aroma. Even if the feces are removed from the litter on a daily basis, a profoundly unpleasant fecal aroma often emanates from the litter box after several days usage.

Other approaches provide a release of a masking fragrance, either by application of moisture (U.S. Pat. No. 3,921,581), by rupture of pressure sensitive microcapsules (U.S. Pat. No. 4,407,231), or by simply admixing the fragrance with the clay or other litter material (U.S. Pat. No. 3,674,625). However, masking fragrances are ineffective against strong ammonia odors and can mask the perception of fecal odor for only a limited time. With these and similar prior art compositions, ammonia odors develop quickly and/or a profoundly unpleasant combination of fecal and fragrance aromas will typically emanate from a litter box after a few days usage.

It can thus be readily appreciated that provision of an animal litter, and method of preparation, which confer on the art the advantage of delaying or retarding the development of ammonia as well as markedly reducing human perception of urine and fecal aromas, but eliminate the previously discussed problems, would be a highly desirable advance over the current state of technology.

OBJECTS OF THE INVENTION

It is an object of this invention to provide an animal litter containing an oxidizing agent and preferably, a solid buffer agent which in combination retard the development of ammonia and markedly reduce human perception of urine and fecal aromas.

It is a second object of this invention to provide a method for the preparation of an animal litter containing an oxidizing agent and preferably, a solid buffer agent which in combination delay the development of ammonia and markedly reduce human perception of urine and fecal aromas.

These and other objects and advantages of the present invention will become more readily apparent after consideration of the following.

STATEMENT AND ADVANTAGES OF THE INVENTION

In its broadest aspect, the invention is directed to an animal litter which comprises an absorbent granular litter material and an effective amount of an oxidizing agent selected from the group consisting of sodium persulfate and ammonium persulfate. Desirably, the litter also contains a solid buffer agent in an amount sufficient to maintain the pH of the litter in the range of 6.2 to 7.8 and preferably 6.6 to 7.4. The buffer may be selected from the group consisting of sodium bicarbonate, sodium dihydrogen phosphate, sodium carbonate, potassium dihydrogen phosphate, ammonium dihydrogen phosphate, ammonium sulfate, ammonium chloride, and sodium borate.

Numerous advantages accrue with the practice of the present invention.

The employment of an oxidizing agent selected from the group consisting of sodium persulfate and ammonium persulfate and a buffer agent selected from the group consisting of sodium bicarbonate, sodium dihydrogen phosphate, sodium carbonate, potassium dihydrogen phosphate, ammonium dihydrogen phosphate, ammonium sulfate, ammonium chloride, and sodium borate, confers a valuable convenience on the invention's practitioners. The animal litter treated in this manner provides two advantageous deodorant effects. First, the animal litter retards the development of ammonia from animal waste. Second, the animal litter markedly reduces human perception of animal urine and fecal odors emanating from the litter. It also reduces the perception of a sour odor.

The retardation of ammonia development is a function of the persulfate alone and occurs even in the absence of the addition of the buffer agent. If persulfate treated litter (without the addition of a pH maintaining agent) is used by a small animal, such as a cat, for several days no ammonia odor develops and perception of fecal odor is markedly reduced. However, the litter develops a new "sour" or "acidic" smell. Addition of a buffer agent to the litter before usage by the animal markedly reduces this sour smell, thus improving the overall aroma profile of the litter.

The incorporation of such oxidizing agent and pH-maintaining agent does not adversely effect other beneficial properties of the granular litter material such as its high sorptivity, low degree of dusting, adequate crush strength and non-toxicity. Furthermore, the animal litter maintains a neutral pH both before and after contact with animal waste. A significant deviation from neutrality would tend to dissuade usage of the litter by the animal.

Thus, the invention provides an animal litter, and method of its preparation, which, after contact with animal waste, exhibits delayed development of ammonia and markedly reduced human perception of urine and fecal odor. The present invention is particularly useful for the control of odors from pet litter, for example, small animal and cat litters. In the following section, the invention is described in greater detail to illustrate several of its especially advantageous embodiments.

DESCRIPTION OF CERTAIN PREFERRED EMBODIMENTS

The improved animal litter of the present invention utilizes generally recognized absorbent granular litter material. Suitable litter material for this invention includes fuller's earth clay, attapulgite clay, diatomaceous earth, bentonite, montmorillonite clay and crushed brick.

Added to the granular component of the animal litter is an effective amount of an oxidizing agent. Suitable oxidizing agents for this invention include sodium persulfate (sodium peroxydisulfate) and ammonium persulfate (ammonium peroxydisulfate). Sodium persulfate and ammonium persulfate are white crystalline products and have been used in certain industrial applications such as polymerization initiation, etching and cleaning. They are nontoxic and safe enough to be used as boosters for hair bleaching formulations and oxidizers for certain types of hair dyes. In these applications they may contact the scalp directly without ill effect.

The granular litter material is treated with the oxidizing agent by spraying the litter material with an aqueous solution of the oxidizing agent. Aqueous solutions containing from 5 to 60% by weight of sodium persulfate or 5 to 70% of ammonium persulfate are preferred. Solutions containing 35 to 45% by weight of sodium persulfate or 40 to 50% by weight of ammonium persulfate are especially preferred. The persulfate solution is sprayed onto the granular litter to give a final amount of persulfate on the granular litter of between 0.5 to 10 weight percent, preferably between 1 and 5 weight percent and most preferably between 2 and 3 weight percent.

Ammonium persulfate or sodium persulfate reacting with animal waste produce a unique odor of their own. Most people smelling used, persulfate-treated animal litter after contact with animal waste would describe the odor as "sour" or "acidic." Although most people might agree that the sour smell is less objectionable than the ammonia odor and fecal aroma characteristic of used animal litter which has not been treated with persulfate, there is no great advantage in trading one odor for another.

The sour smell is markedly reduced by controlling the pH of the animal litter contacted with animal waste during the deodorization process. The pH is controlled by adding a pH-maintaining or buffering agent. Suitable buffering agents for this invention include sodium bicarbonate, sodium dihydrogen phosphate, sodium carbonate, potassium dihydrogen phosphate, ammonium dihydrogen phosphate, ammonium sulfate, ammonium chloride, and sodium borate.

The buffer agent is added to the persulfate-treated granular litter material in an amount effective to maintain the pH in the range from 6.2 to 7.8, preferably 6.6 to 7.4, and most preferably from 6.7 to 7.3. The type and amount of buffer agent required depends on the intrinsic acidity or alkalinity of the granular material and on how it is processed.

The buffer agent is added to the persulfate-treated granular litter material by mixing the treated material with a solid powder of the buffer agent, for example, in a revolving drum. In a continuous process, the solid buffer agent can be metered into the sprayed, granular litter material while it is being conveyed in a manner that facilitates mixing, such as by a screw conveyor. Some buffer agents tend to stick to persulfate treated granular litter if they are mixed immediately or soon after spraying with persulfate. To prevent settling, as might occur during trucking over long distances, a suitable adhesive can be added to the persulfate solution and co-sprayed with the persulfate onto the litter. Examples of adhesives which are not oxidized by persulfate and can be added directly to concentrated persulfate solutions are Rhoplex AC-234 available from Rohm & Haas, and XR-0397 available from H. B. Fuller Company.

By maintaining the pH of the animal litter in contact with animal waste near neutrality as part of the deodorization process, the sour smell of persulfate-treated litter is substantially eliminated and a granular litter material providing delayed development of ammonia and markedly reduced human perception of urine and fecal odor is provided.

A fragrance and dye can be added as optional components to provide a pleasant aroma and appearance.

Persulfates are somewhat unstable with regard to heat and moisture. After persulfate sprayed litter has been stored for some time, the actual quantity of persulfate remaining on the litter can be determined by the following method.

Grind the persulfate-sprayed granular litter to a fine powder in a coffee mill or similar apparatus. (A suitable mill for this purpose is a Moulinex coffee and spice mill, Model 505). Weigh approximately three grams of the ground material to the nearest milligram and place in a screw-capped centrifuge tube of 100 ml capacity. Add 60.0 ml distilled water and extract for ten minutes by vigorous shaking. Centrifuge and pipette 20.0 ml in an Erlenmeyer flask. Add 10.0 ml of a freshly prepared solution which is 0.07M in ferrous ammonium sulfate and 1.5N in $H_2SO_4$. Let stand for one minute and titrate with 0.1N $KMnO_4$ using a burette with a 10 ml capacity. Run a blank on 10.0 ml of the ferrous ammonium sulfate/$H_2SO_4$ solution used above to which is added 20 ml distilled water. The percent persulfate present on the granular material is calculated as follows:

$$\% \text{ ammonium persulfate} = \frac{(A - B)C \times 34.2}{D}$$

$$\% \text{ sodium persulfate} = \frac{(A - B)C \times 35.7}{D}$$

A = ml $KMnO_4$ solution for titrating the blank.

B = ml KMnO₄ solution used for titrating the sample.
C = normality of the KMnO₄ solution.
D = weight of the sample grams.

METHOD FOR BUFFER AGENT

Grind the persulfate-sprayed granular litter to a fine powder in a a Moulinex Model 505 coffee mill or other suitable apparatus. To 10 g of the ground litter add 100 ml distilled water, the pH of which has been previously adjusted, if necessary, to 5.9. Mix and allow to stand at room temperature with occasional mixing for 30 minutes. Measure the glass electrode pH of the suspension. If the pH is within the range 6.7 to 7.3, no auxiliary buffer agent need be added because the litter material itself provides adequate buffering capacity to maintain the pH near neutrality. If the pH is below 6.7 or above 7.3, an appropriate amount of buffer agent is used. The buffer agent is selected from the group which includes sodium bicarbonate, sodium dihydrogen phosphate, sodium carbonate, potassium dihydrogen phosphate, ammonium dihydrogen phosphate, ammonium sulfate, ammonium chloride, and sodium borate. The quantity of buffer agent required to bring the pH within the range 6.7 to 7.3 is determined by trial and error. For example, 10 g quantities of the ground, persulfate-sprayed litter can be mixed with weighed amounts of various buffer agents. One hundred ml of distilled water is added and the pH is measured after 30 minutes as described above. Table 1, below, shows examples of the effect of the addition of buffer agents on different granular litters which have been sprayed with sodium persulfate to a final concentration of between 2 and 4 weight percent.

TABLE I

| Granular Material | Origin/ Processing | Buffer Agent Added | pH Before Addition | pH After Addition |
|---|---|---|---|---|
| Clay Diat. Earth | Nevada/ Dried Only | 0.15% NaH₂PO₄ | 7.9 | 7.9 |
| Clay | Georgia/ Dried Only | 2.0% NaHCO₃ | 5.5 | 7.3 |
| Clay | Florida/ Calcined, 475° F. | 0.2% NaH₂PO₄ | 7.7 | 7.3 |
| Clay | Same/ Calcined, 600° F. | 0.3% NaH₂PO₄ | 8.4 | 7.1 |

If the pH before addition is on the alkaline side of neutrality a buffer agent having an acidic reaction with water will be required. The reverse is true if the pH before addition is on the acid side of neutrality. A wide range of suitable buffer agents is available and cost and convenience may dictate the actual choice.

Further objects of this invention, together with additional features contributing thereto and advantages accruing therefrom, will be apparent from the following examples of the invention.

EXAMPLE 1

Three different granular materials were sprayed with ammonium or sodium persulfate. To five ml portions of each sprayed litter was added 3.5 ml of cat urine. Simultaneously, 3.5 ml of cat urine was added to five ml portions of the corresponding unsprayed granular litters as controls. All samples were incubated in closed containers and smelled periodically. The results are shown in Table II.

TABLE II

| Granular Material | Sprayed With: | Days Incubated | Results |
|---|---|---|---|
| California clay | 1.7% ammonium persulfate | 37 | faint sour odor |
| Same | Unsprayed (control) | 37 | strong ammonia |
| Nevada Diat. Earth | 1.8% ammonium persulfate | 21 | faint sour odor |
| Same | Unsprayed (control) | 13 | strong ammonia |
| Georgia clay | 2% sodium persulfate | 6 | faint sour odor |
| Same | Unsprayed (control) | 2 | strong ammonia |

In all cases, the persulfate-sprayed samples, after being incubated for the indicated number of days, had a mild sour aroma. By contrast, the unsprayed controls, incubated under the same conditions, developed a strong ammonia odor. These results show that persulfates retard development of ammonia from cat urine.

EXAMPLE II

Clay from Georgia was sprayed with sodium persulfate to a final concentration of two percent in a mixing drum. Solid sodium bicarbonate was added to a final concentration of two percent (Table I) and dispersed throughout the clay by tumbling. A spray-dried starch encapsulate containing a floral fragrance was mixed with the litter to a final fragrance level of 0.1%. Three cats housed in individual cages used 4.3 liter portions each of this product in litter pans for seven days. Simultaneously, a second group of three cats similarly housed used equal volumes of the same clay to which only the same amount of fragrance had been added. Each day, the solid wastes were removed and small samples of the litter from each group of cats were removed and placed in screw-topped containers. At the end of seven days, all the litter was discarded and clean pans substituted. Unsprayed clay with fragrance only was offered to the first group of cats (which had used buffered persulfate treated clay plus fragrance for the first seven days) while the second group of cats now used buffered persulfate litter plus fragrance. The products were again used for seven days with daily removal of solid wastes and sampling as described above. At the end of this second seven day period, each day's sample from the buffered persulfate litter used by the first group of cats for the first seven day period was combined with the corresponding sample from the second group of cats. The unsprayed litter samples from the two groups of cats were similarly combined. The two sets of seven samples from the buffered persulfate and unsprayed litters were each presented sequentially to 36 panelists, who were asked when they first detected malodor. The average number of days when malodor could first be detected was:
Buffered persulfate . . . 5.1 days
Unsprayed . . . 2.8 days
The samples from both the buffered persulfate and unsprayed litters collected after three days usage by the cats were then profiled by 15 panelists who had been previously trained to detect floral, urine, and fecal aromas.

Table III shows the relative strengths of floral, urine and fecal notes in the third day's samples from the buffered persulfate and unsprayed litters.

TABLE III

| Aroma Note | Relative Strength (Max. = 10) in | |
|---|---|---|
| | Buffered persulfate | Unsprayed |
| Floral | 2.7 | 1.1 |
| Urine | 0.1 | 1.9 |
| Fecal | 0.2 | 4.6 |

Urine and fecal notes are much more predominant in the unsprayed litter whereas floral notes are stronger in the buffered-persulfate litter. In addition to abating the perception of urine and fecal odor, the buffered persulfate also increases the awareness of floral notes. Both litters contained the same level of floral fragrance before usage by the cats. The fact that floral notes are more subdued in the unsprayed litter indicates that as the unsprayed litter becomes used the growing preponderance of malodor blocks the aroma panelists' perception of the floral notes. Conversely, the reduced level of malodor in the buffered-persulfate litter allows greater perception of floral notes.

EXAMPLE III

A sodium persulfate sprayed litter buffered with sodium bicarbonate and containing 0.1% floral fragrance was prepared as in Example II. It was used by a group of three cats as in Example II. A second group of three cats used a commercially available litter product, "Fresh Step," manufactured and distributed nationally by the Clorox Co. The crossover test design in which each product is used by both groups of cats and daily samples are combined, and which has been described in Example II, was used in this Example. When the two sets of seven samples from each litter product were presented sequentially to 36 panelists, the average number of days usage when malodor could first be detected was:

Buffered persulfate . . . 4.1 days
"Fresh Step" . . . 1.6 days

Sixteen trained aroma panelists profiled the samples collected after three days' usage by the cats. The relative strengths of urine and fecal notes found in the two litters are shown in Table IV.

TABLE IV

| Aroma Note | Relative Strength (Max. = 10) in | |
|---|---|---|
| | Buffered persulfate | Unsprayed |
| Urine | 0.1 | 3.2 |
| Fecal | 0.0 | 3.6 |

Because "Fresh Step" and the buffered-persulfate litter contained fragrances which differed substantially in character, comparison of fragrance notes persisting after use in the two litters would not be meaningful. Table IV shows a marked reduction in the presence of urine and fecal notes in the buffered persulfate litter as compared to "Fresh Step."

While the invention has been described with reference to specific examples, it will be understood by those skilled in the art that a range of proportions may be employed and equivalents may be substituted for compounds thereof without departing from the scope of the invention. The terms and expressions which have been employed are used as terms of description and not of limitation, and there is no intention in the use of such terms and expressions of excluding any equivalents of the features shown and described or portions thereof, it being recognized that various modifications are possible within the scope of the invention.

I claim:

1. An animal litter, which comprises: granular litter material; and an effective amount of an oxidizing agent selected from the group consisting of alkali metal persulfate and ammonium persulfate.

2. An animal litter as recited in claim 1, wherein the granular litter material is an absorbent, inert, inorganic material.

3. An animal litter as recited in claim 1, wherein said granular litter is selected from the group consisting of fuller's earth clay, diatomaceous earth, attapulgite clay, montmorillonite clay and crushed brick.

4. An animal litter as recited in claim 1, containing in addition, a buffering material in an amount sufficient to maintain the pH of the litter between 6.2 and 7.8.

5. An animal litter as recited in claim 4, wherein said buffering material is selected from the group consisting of sodium bicarbonate, sodium dihydrogen phosphate, sodium carbonate, potassium dihydrogen phosphate, ammonium dihydrogen phosphate, ammonium sulfate, ammonium chloride, and sodium borate.

6. An animal litter as recited in claim 1 wherein the oxidizing agent is present in an amount of 0.5 to 10% by weight of the litter material.

7. An animal litter which comprises: granular litter material selected from the group consisting of fuller's earth clay, diatomaceous earth, bentonite, attapulgite clay, montmorillonite clay, and crushed brick; 0.5 to 10% by weight of the litter material of an oxidizing agent selected from the group consisted of alkali metal persulfate and ammonium persulfate; and a buffering material selected from the group consisting of sodium bicarbonate, sodium dihydrogen phosphate, sodium carbonate, potassium dihydrogen phosphate, ammonium dihydrogen phosphate, ammonium sulfate, ammonium chloride, and sodium borate, in an amount sufficient to maintain the pH of the litter between 6.2 and 7.8.

8. An animal litter as recited in claim 7 wherein the buffering material is present in an amount effective to maintain the pH in a range from 6.6 to 7.4.

9. An animal litter as recited in claim 7 wherein a fragrance is added to the animal litter.

10. An animal litter as recited in claim 7 wherein an adhesive is added to the animal litter.

11. An animal litter as recited in claim 7 wherein the oxidizing agent is sodium persulfate.

12. An animal litter as recited in claim 7 wherein the oxidizing agent is ammonium persulfate.

13. A process for preparing animal litter which comprises: contacting a granular, absorbent, inert, and inorganic litter material with an effective amount of an oxidizing agent selected from the group consisting of alkali metal persulfate and ammonium persulfate.

14. A process as recited in claim 13 wherein granular litter is selected from the group consisting of fuller's earth clay, diatomaceous earth, bentonite, attapulgite clay, montmorillonite clay, and crushed brick.

15. A process as recited in claim 13 wherein the oxidizing agent is present in an amount of 0.5 to 10% by weight of the litter material.

16. A process as recited in claim 13 wherein the granular litter material is sprayed with an aqueous solution containing 5 to 70% by weight of ammonium persulfate.

17. An animal litter as recited in claim 13 wherein the buffering material is present in an amount effective to maintain pH in the range of 6.6 to 7.4.

18. A process as recited in claim 13 wherein a spray-dried starch encapsulate containing a fragrance is mixed in with the litter.

19. A process for preparing animal litter, which comprises: spraying an absorbent, inert, granular inorganic litter material selected from the group consisting of fuller's earth clay, diatomaceous earth, bentonite, attapulgite clay, montmorillonite clay, and crushed brick, with an aqueous solution of from 0.5 to 10% by weight of the litter material of an oxidizing agent selected from the group consisting of alkali metal persulfate and ammonium persulfate; and admixing the sprayed material with a solid powder of a buffering material in an amount effective to maintain the pH of the litter between 6.2 and 7.8.

20. A process as recited in claim 19 wherein a granular litter material is admixed with a solid powder of a buffering material selected from the group consisting of sodium bicarbonate, sodium dihydrogen phosphate, sodium carbonate, potassium dihydrogen phosphate, ammonium dihydrogen phosphate, ammonium sulfate, ammonium chloride, and sodium borate.

21. A process as recited in claim 19 wherein the granular litter material is sprayed with an aqueous solution containing 5 to 60% by weight of ammonium persulfate.

* * * * *